United States Patent [19]

Kralowetz

[11] 4,269,551

[45] May 26, 1981

[54] METHOD OF MACHINING CRANKSHAFTS

[76] Inventor: Bruno Kralowetz, St. Ulrich 142, A-4400 Steyr, Austria

[21] Appl. No.: 27,856

[22] Filed: Apr. 6, 1979

[30] Foreign Application Priority Data

Apr. 18, 1978 [AT] Austria ................................ 2712/78

[51] Int. Cl.³ .............................................. B23C 3/06
[52] U.S. Cl. ......................................... 409/132; 29/6; 51/289 R; 82/1 C; 82/9; 409/199; 409/203
[58] Field of Search ................. 409/84, 123, 131, 132, 409/198, 199, 200, 203; 29/6; 82/1 C, 9, 20; 51/105 SP, 289 R

[56] References Cited

U.S. PATENT DOCUMENTS 4,180,359  12/1979  Schmid ............................ 409/203 X

FOREIGN PATENT DOCUMENTS 1803703  5/1970  Fed. Rep. of Germany.
2208593  5/1973  Fed. Rep. of Germany.

Primary Examiner—Z. R. Bilinsky
Attorney, Agent, or Firm—Kurt Kelman

[57] ABSTRACT

A crankshaft is machined at cylindrical portions consisting of mainshaft portions and crankpins and at crankweb side faces associated with the cylindrical portions in a sequence of steps which proceed in the direction from one end of the crankshaft to the other. Each step comprises machining a crankpin which precedes a given succeeding mainshaft portion and a mainshaft portion, when viewed in this direction while the crankshaft is supported by a steady at the given mainshaft portion and machining crankweb side faces adjoining one of the cylindrical portions at the same time as the one cylindrical portion. To improve the accuracy with which the crankshaft can be machined, each of the step comprises machining said one cylindrical portion before the other and machining the crankweb side faces associated with the other cylindrical portion at least in part during the machining of the one cylindrical portion.

2 Claims, 8 Drawing Figures

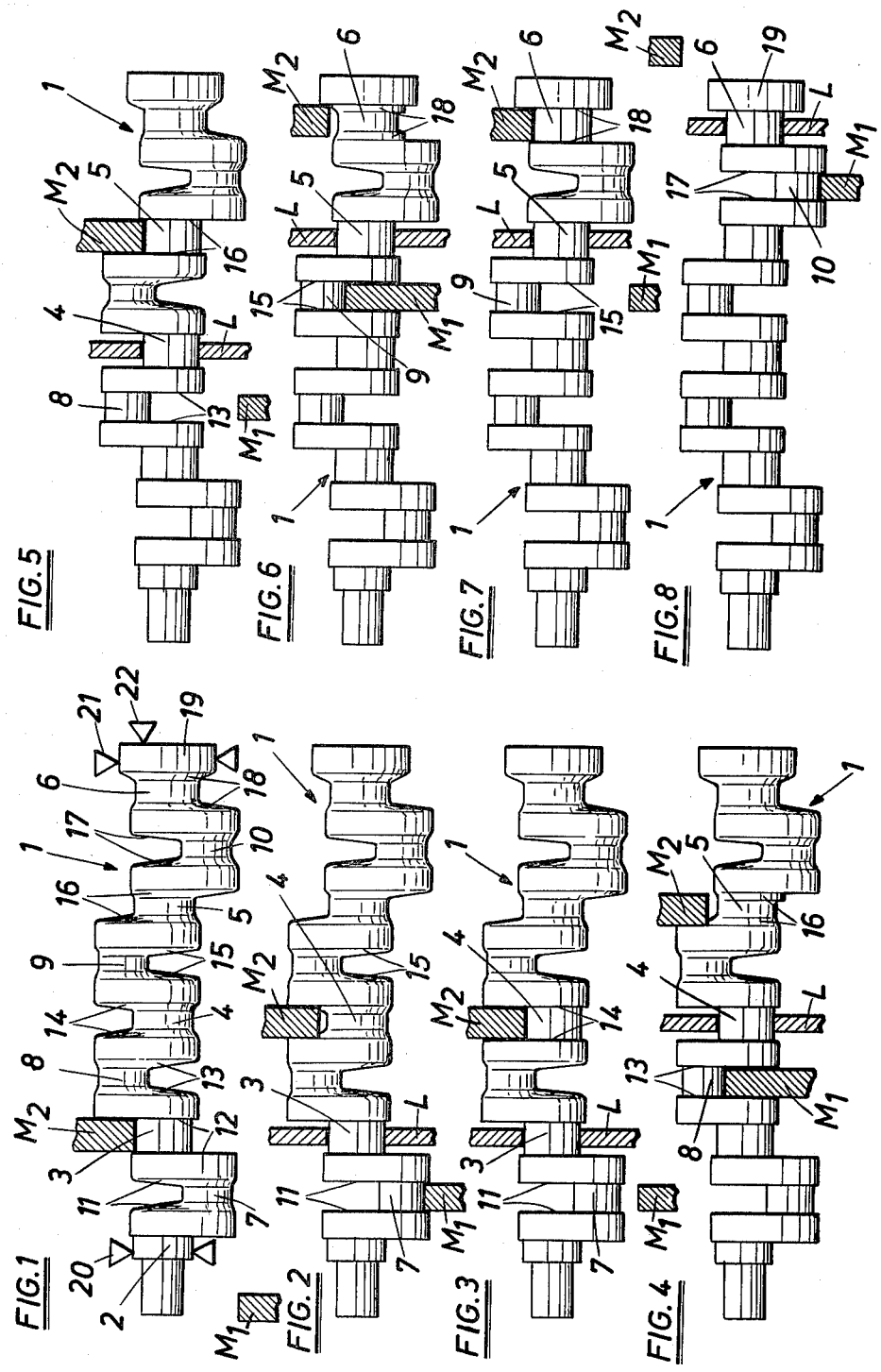

METHOD OF MACHINING CRANKSHAFTS

This invention relates to a method of machining a crankshaft at cylindrical portions consisting of mainshaft portions and crankpins and at crankshaft side faces adjoining the cylindrical portions in a sequence of steps which proceed in the direction from one end of the crankshaft to the other, each step comprising machining a crankpin which precedes a given mainshaft portion and a mainshaft portion which succeeds the given mainshaft portion, when viewed in this direction, while the crankshaft is supported by a steady at the given mainshaft portion, and machining crankweb side faces adjoining one of the cylindrical portions at the same time as the one cylindrical portion.

As the crankpins are machined, internal stresses are released. As a result, the previously machined portion of the crankshaft may be distorted so that the crankshaft must be straightened before it is finish-machined. To prevent such distortion, it has been proposed in German Pat. No. 1,803,703 to machine the several cylindrical portions of the crankshaft, i.e., the crankpins and the mainshaft portions, in successive steps which proceed in the direction from one end of the crankshaft to the other, and to machine each cylindrical portion while the crankshaft is supported at the adjacent cylindrical portion which has been machined.

In that method the stresses result only in a deformation in the crankshaft portion which has not yet been machined. These deformations can be eliminated by the stepwise machining so that the need for straightening the machined crankshaft is eliminated. On the other hand, that method is relatively time-consuming because only one cylindrical portion can be machined at a time, another portion must be supported whenever a new cylindrical portion is to be machined, and the supporting means must be engaged with mainshaft portions and crankpins in alternation.

In order to eliminate these disadvantages, it has been proposed in German Pat. No. 2,208,593 to support only the mainshaft portions and to machine in each step a crankpin and a mainshaft portion at the same time. That method simplifies the supporting and enables faster work but the simultaneous machining of two cylindrical portions causes the shaft to be deformed so that the portions being machined exert unfavorable influences on each other. Because the shaft curves and/or deforms as it is machined, the position of the mainshaft portion relative to the workpiece is changed. This results in a deformation of the cylindrical surface of the mainshaft portion. That deformation in itself requires a larger grinding allowance and has a particularly unfavorable effect on the accuracy and position of the cylindrical portions which are to be machined thereafter because each of these mainshaft portions is engaged by the steady so that any deformation will be propagated and increased. In addition, the simultaneous machining of two cylindrical portions of a crankshaft results in a fairly high heat loading so that the crankshaft expands and this expansion causes the machining tool and the cylindrical portion of the crankshaft to move relative to each other along a helix. For this reason, the axial spacing of the cranks cannot be controlled within close limits so that large grinding allowances are required and involve high grinding costs.

It is an object of the invention to eliminate these disadvantages and to provide a method which is of the kind described first hereinbefore and which permits machining of crankshafts with such a high precision that it is not necessary to straighten the crankshaft when it has been machined. Any deviation will be within very small limits, and only very small grinding allowances are required.

This object is accomplished in accordance with the invention by machining the one cylindrical portion before the other in each step and machining the crankweb side faces adjoining the other cylindrical portion at least in part during the machining of the one cylindrical portion.

Because the crankpin and the mainshaft portion are machined at different times, the heat loading of the crankshaft will be relatively small and there will be no temperature rise of a crankpin disposed between a cylindrical portion which is being machined and the axial stop required for the gripped crankshaft. As a result, the crankshaft is not increased in length by thermal expansion so that a machining along a helix will be avoided and the axial spacing of the cranks will be exactly controlled. At the same time, only small grinding allowances need be made so that the grinding costs will be much reduced and the additional time required compared to the simultaneous machining of the crankpin and mainshaft portion is virtually recovered. That additional time will not be very long anyway because when one cylindrical portion has been machined the crankweb side faces adjoining the second cylindrical portion have been machined too and only that second cylindrical portion remains to be machined. This is accomplished within one revolution of the crankshaft. The additional heat loading which is due to the machining of a cylindrical portion of the crankshaft and the simultaneous machining of the crankweb side faces adjoining another cylindrical portion is hardly significant because the machining of the crankwebs results in a much smaller temperature rise than the machining of the cylindrical portions. Besides, smaller cutting forces are required for the machining of the second cylindrical portion because material from the crankweb side faces has been removed before. As a result, the elastic deformation of the crankshaft caused by the machining will be small and the diameter can be controlled within closer limits. The diametral variations will be inherently smaller than those caused by a machining of two cylindrical portions of the crankshaft at the same time because the cutting forces are not doubled by the simultaneous machining of two cylindrical portions and the machining of each cylindrical portion will not be subjected to the mutual influences of the deformations which are due to the stresses being released. Besides, when the two cylindrical portions are machined at different times, the deformation imparted to the shaft adjacent to the second cylindrical portion by the machining of the first cylindrical portion can be eliminated by the machining of the second cylindrical portion when the machining of the first pin has been completed. This is essential for a particularly accurate shape.

Within the scope of the invention it will be desirable to machine in each step first a crankpin and then the mainshaft portion because this will ensure that the mainshaft portion at which the crankshaft will subsequently be supported has the required accuracy. Besides, the cutting forces required for the machining of the mainshaft portion alone, without the associated crankweb side faces, are so small that they will not result in a distortion of the previously machined crankshaft portion beyond the support.

An illustrative embodiment of the invention is diagrammatically illustrated on the accompanying drawing, in which FIGS. 1 to 8 illustrate the several steps of machining a crankshaft by the method according to the invention.

A crankshaft 1 is to be machined in a single machining sequence at its mainshaft portions 2, 3, 4, 5, 6, at its crankpins 7, 8, 9, 10, and at the crankweb side faces 11, 12, 13, 14, 15, 16, 17, 18 which are associated with these cylindrical portions. This is accomplished by two milling cutters $M_1$, $M_2$ and a steady L. The crankshaft 1 is gripped at a previously turned mainshaft portion 2 and at the periphery of the flange 19 and is axially aligned at the end face of the flange 19. This is indicated in FIG. 1 by the arrows 20, 21, 22. To begin the machining of the crankshaft, the mainshaft portion 3 and the associated crankweb side faces 12 are milled by the cutter $M_2$ whereas the cutter $M_1$ and the steady L are not yet in action (FIG. 1). During the next step, the steady L supports the mainshaft portion 3 which has just been machined and the cutter $M_1$ is used to mill the side faces 11 and the crankpin 7. During the machining of the crankpin 7, the cutter $M_2$ is used to machine the side faces 14 without inwardly moving the cutter to such a depth that the mainshaft portion 4 would be machined too. The crankpin 7, the associated crankweb side faces 11 and a large part of the crankweb side faces 14 associated with the mainshaft portion 4 are now milled during one revolution of the crankshaft (FIG. 2). When the machining of the crankpin 7 has been completed, the cutter $M_1$ is retracted to its initial position and the cutter $M_2$ is used to mill the remainder of the crankweb side faces 14 and the mainshaft portion 4 during another revolution of the crankshaft. The mainshaft portion 3 is still supported by the steady during the machining of the mainshaft portion 4 (FIG. 3).

When the machining of the mainshaft portion 4 by the cutter $M_2$ has been completed, the latter also is retracted to its initial position and the two cutters $M_1$, $M_2$ and the steady L are shifted in unison so that the steady L can then support the mainshaft portion 4 which has just been machined and the crankpin 8, which precedes the steady L when viewed in the direction from left to right in the drawing and has not yet been machined, can be machined by the cutter $M_1$ and the next following mainshaft portion 5 which succeeds the steady when viewed in this direction can be machined by the cutter $M_2$. Without a change of the support, the crankweb side faces 13 are milled first, then the crankpin 8 and the crankweb side faces 16 at the same time, whereas the mainshaft portion 5 associated with the crankweb faces 16 is machined alone when the machining of the crankpin 8 has been completed (FIGS. 4 and 5).

In the next step, the steady L supports the mainshaft portion 5 and the crankpin 9, the mainshaft portion 6 and the associated crankweb side faces 15, 18 are machined in overlapping operations (FIGS. 6 and 7).

During the final step of machining the crankshaft, the cutter $M_2$ remains inactive. The steady supports the last mainshaft portion 6 and in a single operation the cutter $M_1$ is used to mill the last crankpin 10 and the two adjoining crankweb side faces 17 (FIG. 8).

The machining of the crankshaft 1 has thus been completed within a relatively short time and is ready for the final finish-grinding. The crankshaft need not be straightened and only very little grinding is required. This can also be accomplished quickly and without excessive costs.

I claim:

1. A method of machining a crankshaft having two ends at cylindrical portions consisting of mainshaft portions and crankpins and at crankweb side faces adjoining the cylindrical portions in a sequence of steps proceeding from one end of the crankshaft to the other end thereof, each of said steps comprising
   (a) supporting the crankshaft at a mainshaft portion,
   (b) engaging a first cutter for completely machining a crankpin and the crankweb side faces adjoining the crankpin lying on one side of and adjacent said support while simultaneously engaging a second cutter for machining crankweb side faces adjoining a mainshaft portion on the other side of and closest to said support,
   (c) withdrawing the first cutter, and
   (d) continuing the engagement of the second cutter for completely machining the crankweb side faces adjoining the mainshaft portion on the other side of said support.

2. The method of claim 1, further comprising a preliminary machining operation wherein the mainshaft portion adjacent the one crankshaft end is machined, the crankshaft being supported at said machined crankshaft portion in a first one of said steps, and a final machining operation wherein the crankpin adjacent the other end and the crankweb side faces adjoining said crankpin are machined by engaging said first cutter while supporting the crankshaft at a previously machined mainshaft portion.

* * * * *